358-84. OR 3,372,233 SR
SEARCH ROOM

March 5, 1968 C. H. CURREY 3,372,233

HORIZONTAL AND VERTICAL SYNC SIGNAL COMPARISON SYSTEM

Filed March 29, 1965 2 Sheets-Sheet 1

Inventor
CHARLES H. CURREY
By
Mason, Kolehmainen, Rathburn & Wyss.
Attys.

Inventor
CHARLES H. CURREY
By
Mason, Kolehmainen, Rathburn & Wyss.
Attys.

3,372,233
Patented Mar. 5, 1968

3,372,233

HORIZONTAL AND VERTICAL SYNC SIGNAL COMPARISON SYSTEM

Charles H. Currey, Northbrook, Ill., assignor to A. C. Nielsen Company, Chicago, Ill., a corporation of Delaware Filed Mar. 29, 1965, Ser. No. 443,257
12 Claims. (Cl. 178—69.5)

ABSTRACT OF THE DISCLOSURE

The phase of horizontal and vertical synchronization signals from reference and monitored receivers are compared to determine the channel to which the monitored receiver is tuned. First and second coincidence gates deliver output pulses when the horizontal and vertical synchronization signals are respectively in phase and the output pulses are applied to a third coincidence gate which delivers output pulses only when pulses are received from both the first and second gates. A multivibrator and integrator serve to provide a DC signal when output pulses are received from the third gate and the DC signal operates an indicator or recorder.

Figures 1, 2, 2A, 3, 3A:
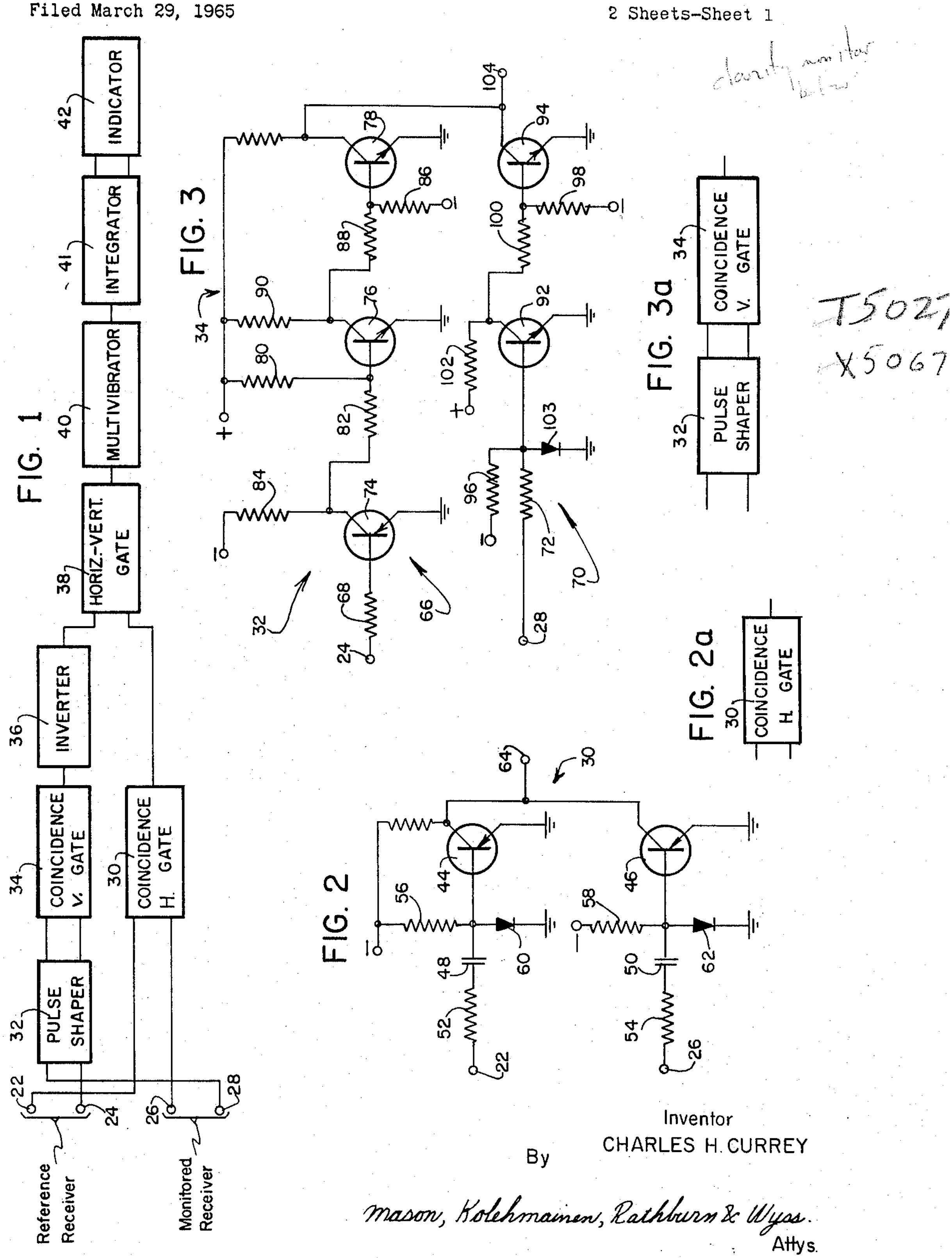

The present invention relates to television audience viewer preference detection, and more particularly to a new system for comparing television synchronization signals.

Many individuals such as advertisers, broadcasters, and the like desire prompt and accurate information about television audience viewing preference of various available television channels, and, accordingly, several methods of providing this information have been suggested. Some proposals have depended upon telephone inquiries of selected viewers, and have been unsatisfactory due to error found to occur because of annoyance caused to the interrogated viewers. Other proposals have avoided this undesirable human factor and have suggested obtaining the desired information directly from the viewer's television receiver. The present invention is an improvement of the latter type of system.

One proposal which has been made is to provide a reference television receiver under the control of the audience surveyor and to compare the reference receiver with a monitored receiver under the control of a television viewer. In past systems of this type, the horizontal synchronization signal transmitted by a particular broadcaster is received by the reference television receiver, and means are provided to compare this horizontal synchronization signal with that received by the monitored receiver. When the synchronization signals of the two receivers are found to be in phase with one another, the audience surveyor in accordance with proposed systems draws the conclusion that the monitored television receiver is tuned to the same broadcast channel as the reference receiver under the control of the audience surveyor.

It has been found, however, that the above proposal is unsatisfactory because the horizontal synchronization signals of different television broadcast channels may occasionally be in phase with one another. This undesirable phase coincidence occurs frequently enough to introduce significant error into the results of the audience survey. Experimentation in the Chicago area, for example, has indicated that a detector based on the principle of horizontal synchronization signal phase comparison alone will not be able to satisfactorily differentiate between broadcast channels 5, 7 and 9.

Accordingly, it is an object of the invention to provide a television audience survey system which overcomes the above disadvantage.

It is another object of the invention to provide a system for comparing television synchronization signals which does not suffer inaccuracy caused by interchannel horizontal synchronization signal phase coincidence.

It is another object of the invention to provide apparatus for determining to what channel a monitored television receiver is tuned by a phase comparison of both its horizontal and vertical synchronization signals with corresponding signals from a reference receiver capable of being tuned to the channels receivable by the monitored receiver.

Further objects and advantages of the present invention will become apparent as the following description proceeds and the features of novelty which characterize the invention will be pointed out with particularity in the claims annexed to and forming a part of this specification.

Briefly, a system for comparing synchronization signals received by a pair of television receivers constructed in accordance with the invention may comprise means for comparing both the horizontal and the vertical synchronization signals which are received by two receivers: a reference receiver tuned to a known broadcast channel and a monitored receiver tuned to an unknown broadcast channel. The horizontal synchronization signals from the two receivers are compared by means of a coincidence gate which delivers output pulses when the two horizontal synchronization signals are in phase. A pulse shaper is provided for the vertical synchronization signals of both receivers in order to provide rectangular pulses, which are then compared by means of another coincidence gate. When the vertical synchronization signals are in phase, the vertical coincidence gate delivers output pulses, which are passed through an inverter to make them compatible with the pulses from the horizontal coincidence gate. Still another coincidence gate is supplied with the output pulses from the horizontal coincidence gate and from the inverter and in turn delivers output pulses during the periods when both the horizontal and vertical synchronization signals of the two receivers are in phase. Additionally, circuitry including a multivibrator and an integrator transforms output pulses from the horizontal-vertical coincidence gate into a DC signal which can then be fed to a suitable indicator or recorder. When the monitored receiver is tuned to the same known broadcast channel as the reference receiver, the horizontal and vertical synchronization signals received by each set are in phase, and the indicator or recorder serves to inform the audience surveyor that the monitored receiver is tuned to the known channel.

Figure 4:
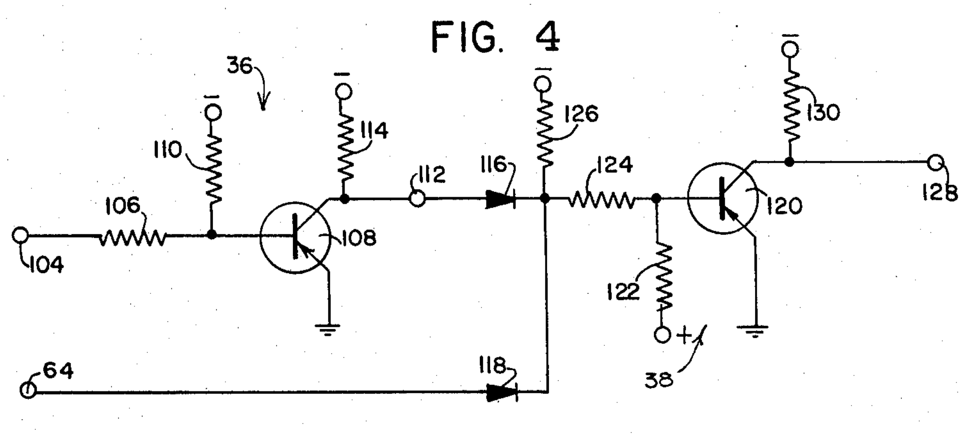
Figure 4A:
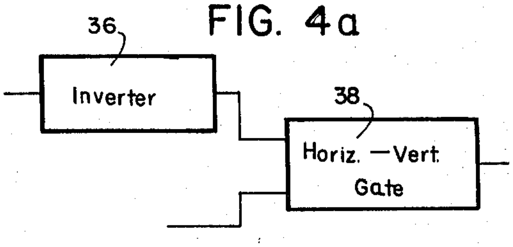
Figures 5, 5A:
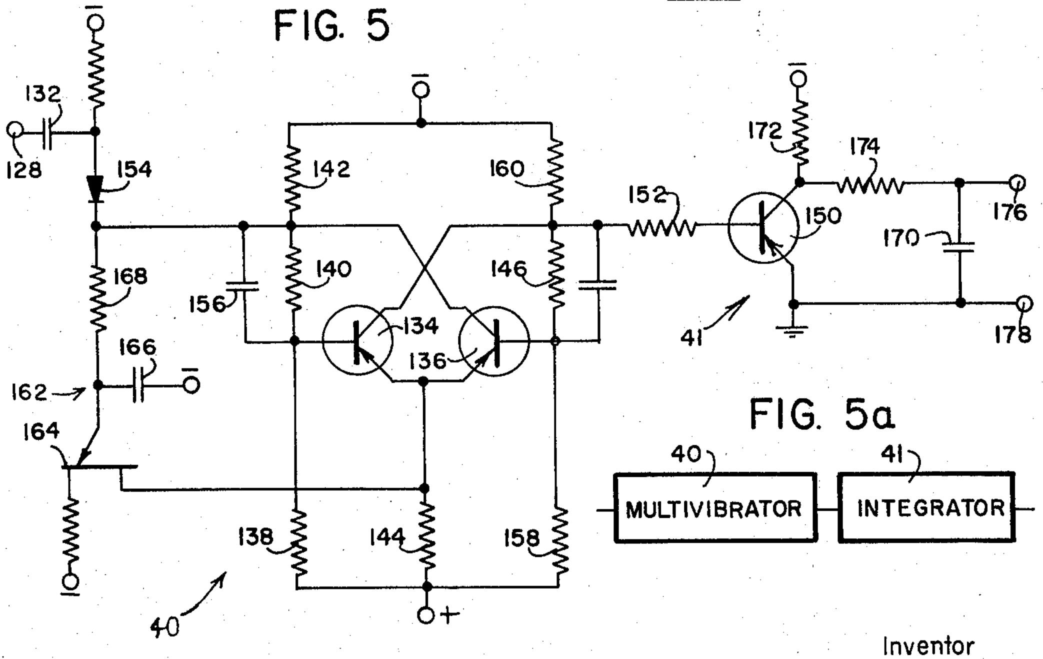

For a better understanding of the present invention reference may be had to the accompanying drawings, in which:

FIG. 1 is a block diagram illustrating the components of a synchronization signal comparison system embodying the present invention;

FIGS. 2, 3, 4 and 5 are schematic diagrams of circuitry for performing the functions of the components illustrated in block form in FIG. 1, wherein FIG. 2 illustrates the horizontal coincidence gate, FIG. 3 illustrates the pulse shaper and vertical coincidence gate, FIG. 4 illustrates the inverter and horizontal-vertical coincidence gate and FIG. 5 illustrates the multivibrator and integrator; and FIGS. 2*a*, 3*a*, 4*a* and 5*a* are segments of the circuit shown in block diagram form in FIG. 1 and correspond to the circuitry illustrated in FIGS. 2, 3, 4 and 5 respectively.

Referring now to the drawings, FIG. 1 illustrates a synchronization signal comparison system 20 constructed in accordance with the present invention. As is known, the broadcast transmission from a television transmitter includes synchronization signals which are received and separated by a properly tuned television receiver wherein they are used to synchronize the receiver's beam-reflection circuits so that they operate in synchronism with the scanning at the transmitter. The television synchronizing signals in the United States are of two types, a horizontal synchronizing signal having a frequency of about 15.75 kilocycles per second, and a vertical synchronizing signal having a frequency of about 60 cycles per second. In accordance with the present invention these horizontal and vertical synchronization signals are used to compare a reference television receiver with a monitored television receiver to determine whether the monitored receiver is or is not tuned to the same channel as the reference television receiver.

To this end, the synchronization signal comparison system 20 of the present invention has input terminals 22 and 26 for receiving the horizontal synchronization signals from a pair of television receivers, and with input terminals 24 and 28 for receiving the vertical synchronization signals from the pair of receivers. A coincidence gate 30, connected to the inputs 22 and 26, delivers output pulses whenever the horizontal synchronization signals of the two television receivers are in phase with one another.

It has been found that the horizontal synchronization signals of two different television channels may periodically be in phase. This spurius coincidence introduces significant error into the audience survey when horizontal synchronization signal comparison alone is used. In accordance with a feature of the present invention the vertical synchronization signals of the two receivers are compared as well. Accordingly, a pulse shaper 32 forms the vertical synchronization signals from the two receivers into rectangular pulses which are fed into a coincidence gate 34 which emits pulses when the vertical synchronization signals of the two receivers are in phase. An inverter 36 makes the pulses from the vertical signal coincidence gate compatible with those from the horizontal coincidence gate 30, and these pulses are then fed to a horizontal-vertical coincidence gate 38 which delivers pulses only during those periods when both the vertical synchronization signals and the horizontal synchronization of the two receivers are in phase.

Despite the fact that the horizontal or vertical synchronization signals of different television stations may be in phase periodically, it has been found that a comparison of both the horizontal and vertical synchronization signals leads to a highly accurate indication of whether a pair of television receivers are tuned to the same channel. Thus when the synchronization signal comparison system 20 delivers pulses from the coincidence gate 38, a conclusion that the reference receiver and the monitored receiver are tuned to the same television channel may accurately be drawn. Accordingly, in order to preserve this information for statistical use, the output from the horizontal-vertical gate 38 is fed to a multivibrator circuit 40 and an integrator circuit 41 which transform pulses from the gate 38 into a DC signal which in turn is fed into a suitable indicator or recorder 42.

The vertical and horizontal synchronization signals received by the two television receivers may be taken from the receivers and fed into the inputs 22–28 in any suitable fashion. One method is to use a mobile monitoring station containing the system 20 and the reference television receiver and equip it with means for remotely receiving the horizontal and vertical synchronization signals received by television receivers in the location of the mobile unit. Another method is to connect the input terminals 22–28 of the system 20 directly to both the monitored television receiver and the reference television receiver. One method of making this connection is to take the horizontal synchronization signal pulses directly from the television receiver picture tube cathode, or to take them from the horizontal oscillator sections of the receivers, and to take the vertical synchronization signal pulses from the vertical oscillator sections of the television receivers.

FIGS. 2–5 schematically illustrate particular circuits capable of performing the functions of the components of the system 20, which are illustrated in block form in FIG. 1. The horizontal coincidence gate 30 (FIG. 2) receives the horizontal synchronization pulses from the reference and the monitored receivers and emits output pulses when the synchronization pulses are in phase. To this end, the gate 30 includes a pair of transistors 44 and 46 which are connected to the input terminals 22 and 26 through a pair of coupling capacitors 48 and 50 and a pair of resistors 52 and 54. The transistors 44 and 46 are arranged in a grounded emitter configuration and are normally held in a conductive state by a negative bias voltage applied through a pair of resistors 56 and 58. A pair of diode clippers 60 and 62 are connected to the base terminals of the transistors 44 and 46. An output terminal 64 of the horizontal gate 30 is normally grounded through the conductive transistors 44 and 46.

Whenever a positive going horizontal synchronization pulse is received at an input 22 or 26, the corresponding one of the transistors 44 and 46 is rendered nonconductive. However, unless pulses are received simultaneously at terminals 22 and 26 the output terminal 64 remains grounded through one of the transistors 44 and 46. If horizontal synchronization pulses are received simultaneously at the terminals 22 and 26, both transistors are placed in a nonconductive state, and the terminal 64 drops to a negative value. Accordingly, when the horizontal synchronization signals of the two receivers are in phase, and only then, a series of negative-going pulses appear at the terminal 64.

The circuit including the vertical pulse shaper 32 and the vertical coincidence gate 34 (FIG. 3) performs an analogous function for the vertical synchronization signals and includes a first branch 66 which receives vertical synchronization signals from one receiver through the input terminal 24 and a resistor 68 and a second branch 70 receiving the vertical synchronization signal of a second receiver through the input terminal 28 and a resistor 72. The branch 66 includes three transistors 74, 76 and 78, each arranged in a grounded emitter configuration. The transistor 74 is normally in a nonconductive state, but a negative going pulse received through the input terminal 24 places the transistor 74 in a conductive state.

The transistor 76 is normally held in a nonconductive state by a negative bias voltage applied through a voltage dividing circuit including three resistors, 80, 82 and 84. When a negative-going pulse places the transistor 74 in a conductive state, the resistor 84 is connected to ground and transistor 76 is placed in a conductive state by a positive bias voltage applied through the resistor 80. The transistor 78 is normally held in a conductive state by a positive bias voltage applied by a voltage dividing circuit including resistors 86, 88 and 90. When a negative going pulse causes the transistors 74 and 76 to be rendered conductive, as previously described, a negative voltage applied through the resistor 86 places the transistor 78 in a nonconductive state.

The branch 70 includes a pair of transistors 92 and 94 in grounded emitter configuration. Transistor 92 is normally held in a nonconductive state by a negative bias voltage applied across a resistor 96, and transistor 94 is normally held in a conductive state by a positive bias voltage applied through a voltage dividing circuit including resistors 98, 100 and 102. When a positive going pulse is received through the input terminal 28, the transistor 92 is placed in a conductive state so that resistor 102 is connected to ground and transistor 94 is placed in a nonconductive state by a negative voltage applied through the resistor 98. A diode clipper 103 is connected to the base terminal of the transistor 92.

An output terminal 104 of the vertical coincidence gate 34 is normally grounded through the conductive transistors 78 and 94. As described above, a negative going pulse applied to the circuit branch 66 through input 24 causes the transistor 78 to be rendered nonconductive, and a positive going pulse applied to the branch 70 through input terminal 28 causes the transistor 94 to be rendered nonconductive. Coincidence of a negative pulse from one receiver and a positive pulse from the other receiver will result in both transistors 78 and 94 being simultaneously rendered nonconductive, and a positive going pulse will be applied to the output terminal 104. In this manner the vertical gate 34 emits output pulses during phase coincidence of the vertical synchronization signals received by the reference and monitored receivers.

Although the illustrated circuit is designed for use with a reference receiver supplying positive going horizontal pulses and negative going vertical pulses and a monitored receiver supplying positive going horizontal and vertical pulses, the polarity of these pulses depends upon incidental factors such as the circuit design of the receivers used and the way in which the pulses are supplied to the input terminals 22, 24, 26 and 28. Slight modifications in the illustrated horizontal gate 30 and vertical gate 34 may be made by one skilled in the art to adapt the circuits for pulses of different polarities.

The vertical inverter 36 (FIG. 4) reverses the polarity of the positive going pulses delivered by the vertical gate 34 to make them compatible with the negative going pulses delivered by the horizontal gate 30. The inverter 36 is connected through a resistor 106 to the output terminal 104 of the vertical gate 34, and includes a transistor 108 arranged in grounded emitter configuration. A negative bias voltage applied through a resistor 110 normally holds the transistor 108 in a conductive state, but positive going pulses received at the terminal 104 of the vertical gate 34 place the transistor 108 in a nonconductive state so that a negative going pulse is applied to an inverter output terminal 112 through a resistor 114.

The horizontal-vertical gate 38 (FIG. 4) delivers a series of positive going pulses whenever both the horizontal and vertical synchronization signals of the receivers are coincident. The gate 38 includes a pair of diodes 116 and 118 connected to the terminals 112 and 64. A transistor 120 is normally held in a nonconductive state by a positive bias voltage applied through a voltage divider circuit including resistors 122, 124 and 126. The horizontal-vertical gate 38 is of the NAND type, and the transistor 120 is placed in a conductive state only when negative going pulses are simultaneously received at the terminals 64 and 112. This pulse coincidence reverse biases the diodes 116 and 118 to place the transistor 120 in a conductive condition to supply a positive-going pulse to an output terminal 128. Thus, coincidence of both the horizontal and vertical synchronization pulses of both the monitored and the reference receiver results in a series of positive-going output pulses at the terminal 128.

The multivibrator circuit 40 (FIG. 5) is connected to the output terminal 128 of the horizontal-vertical coincidence gate 38 through a coupling capacitor 132, and includes a pair of emitter coupled transistors 134 and 136. The transistor 134 is normally held in a conductive state by a negative bias voltage applied through a voltage dividing circuit including resistors 138, 140 and 142, while the transistor 136 is normally held in a nonconductive state by a positive bias voltage applied through a resistor 144, the conductive transistor 134 and a resistor 146. The integrator circuit 41 includes a transistor 150 arranged in a grounded emitter configuration and normally held in a nonconductive state by a positive bias voltage applied through the resistor 144, conductive transistor 134, and a resistor 152.

When a positive going pulse is received at the output terminal 128 of the horizontal-vertical coincidence gate 38, a positive bias voltage is applied to the transistor 134 through a normally reverse biased diode 154 and a capacitor 156, and the transistor 134 is thereby placed in a nonconductive state. As a result, the transistors 136 and 150 are placed in a conductive state by negative bias voltages applied through voltage dividing circuits including the resistor 146 and resistors 158 and 160.

In accordance with a feature of the invention, a unijunction transistor trigger circuit 162, including a unijunction transistor 164 and a capacitor 166, serves to return the multivibrator 40 to its normal condition after a period of time elapses subsequent to each pulse received. More specifically, when a positive going pulse from the horizontal-vertical coincidence gate 38 causes the transistor 136 to be placed in a conductive state, the capacitor 166 commences to be charged by a current flowing through the resistor 144, transistor 136, and a resistor 168. When a sufficiently large voltage is achieved, the unijunction transistor 164 will be turned on, and both transistors 134 and 136 will be held in a nonconductive state as the capacitor 166 discharges through the unijunction transistor 164. However, the transistor 134 is returned to the normally conductive state by a negative bias voltage appearing across the capacitor 156. Thus, a positive going pulse at the terminal 128 causes the multivibrator circuit 40 to hold the normally nonconductive transistor 150 in a conductive state for a period of time, the duration of which is substantially dependent upon the RC constant of the circuit including the capacitor 166 and the resistor 168.

The integrator circuit 41 (FIG. 5) includes a capacitor 170 which charges through resistors 172 and 174 in the normal condition when no pulses are received at the terminal 126 and the transistor 150 is held in the nonconductive state. In this condition a voltage appears across a pair of output terminals 176 and 178 of the circuit 41, and this voltage, occurring during periods when the synchronization signals of the monitored and reference receivers do not coincide, may be used to actuate a suitable indicator or recorder 42, illustrated only in the block diagram of FIG. 1. When the monitored and reference receivers are tuned to different broadcast channels, it is possible for a small amount of spurius coincidence to exist, and for a few pulses to be received at the terminal 128. Each such pulse causes the transistor 150 to be placed in a conductive state for a short time, and during this time the capacitor 170 begins to discharge. However, the circuits 40 and 41 are arranged so that the capacitor 170 does not become completely discharged until a sustained period of coincidence is experienced. Thus, absence of a difference in potential across the output terminals 176 and 178 is a reliable indication that the reference and monitored receivers are tuned to the same broadcast channel. Conversely, unless this lack of voltage exists, it can be concluded that the receivers are tuned to two different broadcast channels.

Although the present invention has been described with reference to an illustrative embodiment thereof, it should be understood that numerous modifications and embodiments can be devised by those skilled in the art that will fall within the spirit and scope of this invention.

What is claimed as new and desired to be secured by Letters Patent of the United States is:

1. A system for determining the tuning condition of a television receiver of the type using vertical and horizontal synchronizing signals, said system comprising a reference receiver operable to known tuning conditions and providing reference vertical and horizontal synchronizing signals, means for deriving vertical and horizontal synchronizing signals from the television receiver, first comparing means for comparing the refeernce vertical synchronizing signals and the derived vertical synchronizing signal, second comparing means for comparing the reference horizontal synchronizing signals and the derived horizontal synchronizing signal, and means controlled by the first and second comparing means for providing an indication of the tuning condition of the television receiver.

2. Apparatus for comparing horizontal and vertical synchronization signals of a reference receiver tuned to a known broadcast channel with the horizontal and vertical synchronization signals of a monitored receiver tuned to an unknown channel, said apparatus comprising first gate circuitry for producing a signal in response to phase coincidence of the horizontal synchronization signals of the reference and the monitored receivers, second gate circuitry for producing a signal in response to phase coincidence of the vertical synchronization signals of the reference and monitored receivers, and third gate circuitry controlled by said first and second gate circuitry for producing a signal in response to the simultaneous production of signals by said first gate circuitry and said second gate circuitry.

3. Apparatus for comparing horizontal and vertical synchronization signals received by a reference and a monitored television receiver, said apparatus comprising a series of coincidence gate circuits for producing a signal when simultaneous phase coincidence of horizontal and vertical synchronization signals exists in said receivers, pulse generating means connected to said series of coincidence gates for generating a series of pulses of uniform duration in response to the production of signals by said series of coincidence gates, an output, and means including an integrator connected to said pulse generating means for driving said output to a predetermined potential in response to a sustained series of pulses generated by said pulse generating means.

4. A system for determining the tuning condition of a broadcast receiver of the type using first and second synchronizing signals, said system comprising a reference receiver operable to known tuning conditions and providing reference first and second synchronizing signals, means for deriving first and second synchronizing signals from the broadcast receiver, first comparing means for comparing the first synchronizing signals received by the broadcast and reference receivers, second comparing means for comparing the second synchronizing signals received by the broadcast and reference receivers, and means controlled by the first and second comparing means for providing an indication of the tuning condition of the broadcast receiver.

5. A system for determining the tuning condition of a broadcast receiver of the type using a plurality of synchronizing signals, said system comprising a reference receiver operable to known tuning conditions and providing reference synchronizing signals, means for deriving synchronizing signals from the broadcast receiver, comparing means for comparing a plurality of the synchronizing signals received by the broadcast receiver with the corresponding reference synchronizing signals, and means controlled by the comparing means for providing an indication of the tuning condition of the broadcast receiver.

6. A method for determining the tuning condition of a television receiver of the type using vertical and horizontal synchronizing signals, said method comprising the steps of deriving reference vertical and horizontal synchronizing signals from a reference receiver operable to known tuning conditions, deriving the horizontal and vertical synchronizing signals from the television receiver, comparing the reference vertical synchronizing signal with the vertical synchronizing signal derived from the television receiver, comparing the reference horizontal synchronizing signal with the horizontal synchronizing signal derived from the television receiver, and providing an indication of the tuning condition of the television receiver in accordance with the results of the comparisons of the reference and derived vertical and horizontal synchronizing signals.

7. A method for determining the tuning condition of a television receiver of the type using vertical and horizontal synchronizing signals and operable to one of several tuning conditions, said method comprising the steps of deriving reference vertical and horizontal synchronizing signals from a reference receiver operable to a known tuning condition, deriving the horizontal and vertical synchronizing signals from the television receiver, comparing the reference vertical and horizontal synchronizing signals with the vertical and horizontal synchronizing signals derived from the television receiver, and providing an indication that the television receiver is tuned to the known tuning condition when the reference and derived vertical and horizontal synchronizing signals are similar.

8. A system for determining the tuning condition of a television receiver of the type using vertical and horizontal synchronizing signals, said system comprising a reference receiver operable to known tuning conditions and providing reference vertical and horizontal synchronizing signals, means for deriving vertical and horizontal synchronizing signals from the television receiver, first comparing means for comparing the reference vertical synchronizing signal and the derived vertical synchronizing signal, second comparing means for comparing the reference horizontal synchronizing signal and the derived horizontal synchronizing signal, and means controlled by the first and second comparing means for providing an indication of the tuning condition of the television receiver, said last mentioned means including gate circuit means connected to the first and second comparing means for emitting output signals in response to similarity of the reference and derived horizontal and vertical synchronizing signals, and means connected to said gate circuit means for providing a predetermined indicating signal in response to emission of output signals by said gate circuit means.

9. Apparatus for determining the tuning condition of a television receiver of the type using vertical and horizontal synchronization signals, said system comprising a reference receiver operable to known tuning conditions and providing reference vertical and horizontal synchronization signals, means for deriving vertical and horizontal synchronization signals from the television receiver, first comparing means for comparing the phase of the reference vertical synchronization signals and the derived vertical synchronization signal, said first comparing means including means for shaping the derived and reference vertical synchronization signals into series of pulses and first gate means connected to said pulse shaping means for emitting output pulses when said series of pulses are in phase, second comparing means for comparing the phase of the reference horizontal synchronization signal and the derived horizontal synchronization signal, said second comparing means including second gate means for emitting output pulses when said reference and derived horizontal synchronization signals are similar, and means controlled by the first and second comparing means for providing an indication of the tuning condition of the television receiver.

10. Apparatus for determining the tuning condition of a television receiver of the type using vertical and horizontal synchronization signals, said system comprising a reference receiver operable to known tuning conditions and providing reference vertical and horizontal synchronization signals, means for deriving vertical and horizontal synchronization signals from the television receiver, first comparing means for comparing the phase of the reference vertical synchronization signals and the derived vertical synchronization signal, said first comparing means including means for shaping the derived and reference vertical synchronization signals into series of pulses and first gate circuit means connected to said pulse shaping means for emitting output pulses when said series of pulses are in phase, second comparing means for comparing the phase of the reference horizontal synchronization signal and the derived horizontal synchronization signal, said second comparing means including second gate circuit means for emitting output pulses when said reference and derived horizontal synchronization signals are similar, and means controlled by the first and second comparing means for providing an indication of the tuning condition of the television receiver, said last mentioned means including third gate circuit means connected to the first and second comparing means for emitting output signals in response to similarity of the reference and derived horizontal and vertical synchronizing signals and means connected to said third gate circuit means for providing a predetermined signal in response to prolonged emission of output signals by said gate circuit means.

11. Apparatus for determining the tuning condition of a television receiver of the type receiving synchronizing pulses, said apparatus comprising a reference receiver operable to a known tuning condition for providing reference synchronizing pulses, means for deriving the synchronizing pulses received by the television receiver, gate circuit means receiving the reference and derived synchronizing pulses and delivering output pulses whenever the reference and derived synchronizing pulses coincide, multivibrator circuit means connected to said gate circuit means and adapted to be changed from a first condition to a second condition by said output pulses, trigger circuit means connected to said multivibrator circuit means for returning said multivibrator circuit means to said first condition after a predetermined time whereby said multivibrator circuit means is effective to generate pulses of uniform width, and means controlled by said multivibrator circuit means for providing an indication in response to a prolonged series of said uniform width pulses that the television receiver is tuned to the known tuning condition.

12. Apparatus for determining the tuning condition of a television receiver of the type receiving horizontal and vertical synchronizing pulses, said apparatus comprising a reference receiver operable to a known tuning condition for providing reference horizontal and vertical synchronizing pulses, means for deriving the horizontal and vertical synchronizing pulses received by the television receiver, first gate circuit means receiving the reference and derived vertical synchronizing pulses and delivering output pulses whenever the reference and derived vertical synchronizing pulses coincide, second gate circuit means receiving the reference and derived horizontal synchronizing pulses and delivering output pulses whenever the reference and derived horizontal synchronizing pulses coincide, third gate circuit means receiving the output pulses from the first and second gate circuit means and delivering output pulses in response to simultaneous coincidence of the reference and derived vertical and horizontal synchronizing pulses, multivibrator circuit means connected to said third gate circuit means and adapted to be changed from a first condition to a second condition by output pulses from the third gate circuit means, trigger circuit means connected to said multivibrator circuit means for returning said multivibrator circuit means to said first condition after a predetermined time whereby said multivibrator circuit means is effective to generate pulses of uniform width, and means controlled by said multivibrator circuit means for providing an indication in response to a prolonged series of said uniform width pulses that the television receiver is tuned to the known tuning condition.

References Cited

UNITED STATES PATENTS

| | | | |
|---|---|---|---|
| 2,903,508 | 9/1959 | Hathaway | 325—31 |
| 3,312,900 | 4/1967 | Jaffe | 179—2 XR |

ROBERT L. GRIFFIN, *Primary Examiner.*

JOHN W. CALDWELL, *Examiner.*

R. L. RICHARDSON, *Assistant Examiner.*